United States Patent [19]
Takahashi et al.

[11] Patent Number: 5,173,370
[45] Date of Patent: Dec. 22, 1992

[54] MAGNETIC RECORDING MEDIUM HAVING A MAGNETIC THIN FILM WITH BOTH PARAMAGNETIC PHASE AND FERROMAGNETIC PHASE IRON NITRIDE WITH PARAMAGNETIC PHASE ZETA FE₂N AS ITS LARGEST COMPONENT

[75] Inventors: Seiichiro Takahashi, Osaka; Minoru Kume, Nara; Koutaro Matsuura, Kyoto, all of Japan

[73] Assignee: Sanyo Electric Co., Ltd., Osaka, Japan

[21] Appl. No.: 564,256

[22] Filed: Aug. 8, 1990

[30] Foreign Application Priority Data

Aug. 10, 1989 [JP] Japan .................................. 1-208130
Mar. 28, 1990 [JP] Japan .................................. 2-80103

[51] Int. Cl.⁵ .................................................. G11B 5/00
[52] U.S. Cl. .................................... 428/694; 428/698; 428/900
[58] Field of Search ............... 428/689, 692, 694, 698, 428/900

[56] References Cited

U.S. PATENT DOCUMENTS

| | | | |
|---|---|---|---|
| 4,791,021 | 12/1988 | Honda et al. | 428/329 |
| 5,006,395 | 4/1991 | Hori et al. | 428/141 |
| 5,112,701 | 5/1992 | Katsuragawa | 428/694 |

FOREIGN PATENT DOCUMENTS 59-228705 12/1984 Japan .

*Primary Examiner*—Paul J. Thibodeau
*Assistant Examiner*—Stevan A. Resan
*Attorney, Agent, or Firm*—Nikaido, Marmelstein, Murray & Oram

[57] ABSTRACT

A perpendicular magnetic recording medium comprises a non-magnetic substrate having one main surface and a magnetic film of Fe-N or Fe-Co-N formed on the substrate's main surface. The magnetic film includes not only ferromagnetic phase, but also $\zeta$-Fe₂N of paramagnetic phase. The magnetic film is characterized by having columnar crystal structure extending in a direction perpendicular to the substrate's main surface and perpendicular magnetic anisotropy by including $\zeta$-Fe₂N.

4 Claims, 20 Drawing Sheets

MAGNETIC RECORDING MEDIUM HAVING A MAGNETIC THIN FILM WITH BOTH PARAMAGNETIC PHASE AND FERROMAGNETIC PHASE IRON NITRIDE WITH PARAMAGNETIC PHASE ZETA FE$_2$N AS ITS LARGEST COMPONENT

BACKGROUND OF THE INVENTION

1. Field of the Invention

The present invention relates generally to perpendicular magnetic recording media, and more particularly, to a perpendicular magnetic recording medium comprising a magnetic film formed of iron-nitrogen (Fe-N) system alloy or iron-cobalt-nitrogen (Fe-Co-N) system alloy and a forming method therefor.

2. Description of the Related Art

Perpendicular magnetic recording is essentially suitable to high density recording because self-demagnetizing effect is suppressed in proportion to the increase of recording density. Cobalt-chromium (Co-Cr) system magnetic film produced by sputtering method or vacuum evaporation method is known as the medium for perpendicular magnetic recording.

Co-Cr magnetic film is superior as a perpendicular magnetic recording medium owing to its high magnetic anisotropy and saturation magnetization, but has the drawback that cobalt is expensive. Therefore, a Fe-N system perpendicular magnetic recording medium based on economical iron is proposed, as disclosed in Japanese Patent Laying-Open No. 59-228705, for example. The main component of this recording medium is iron nitride having a hexagonal crystal structure $\epsilon$-Fe$_x$N ($2 \leq X \leq 3$), which is formed by physical vapor deposition (for example, sputtering method, vacuum evaporation method) in Ar gas flow, in mixed gas flow of Ar and N$_2$, or in mixed gas flow of Ar, N$_2$, and H$_2$, using as starting materials powders, sintered compacts, or bulk materials of at least one member selected from the group consisting of iron and nitrides such as Fe, $\gamma'$-Fe$_4$N, $\epsilon$-Fe$_x$N($2 \leq X \leq 3$), and $\zeta$-Fe$_2$N.

The above mentioned magnetic film of iron nitride having a hexagonal crystal structure as the main component can not be formed at a high rate. The growth rate of the film thickness is 50 Å/min by sputtering, for example, and is not suited for mass production.

SUMMARY OF THE INVENTION

In view of the foregoing, an object of the present invention is to provide a perpendicular magnetic recording medium comprising a Fe-N system or Fe-Co-N system magnetic film having satisfactory perpendicular magnetic anisotropy that can be formed at high speed, and a method of forming the same.

In accordance with one aspect of the present invention, the perpendicular magnetic recording medium comprises a non-magnetic substrate having one main surface, and a Fe-N system magnetic film formed on the substrate's main surface. The magnetic film includes not only ferromagnetic phase, but also $\zeta$-Fe$_2$N of paramagnetic phase as the largest component. The magnetic film has a columnar crystal structure extending in a direction perpendicular to the substrate's main surface and perpendicular magnetic anisotropy by including $\zeta$-Fe$_2$N.

In accordance with another aspect of the present invention, the method of forming a perpendicular magnetic recording medium comprises the steps of heating a non-magnetic substrate having one main surface to a predetermined temperature, providing iron vapor above the substrate's main surface from a direction orthogonal to the main surface, and also nitrogen plasma at the same time, so that a magnetic film is formed including not only ferromagnetic phase, but also $\zeta$-Fe$_2$N of paramagnetic phase as the largest component, and having a columnar crystal structure extending in a direction perpendicular to the substrate's main surface and perpendicular magnetic anisotropy.

In accordance with a further aspect of the present invention, the perpendicular magnetic recording medium comprises a non-magnetic substrate having one main surface, and a Fe-Co-N system magnetic film formed on the substrate's main surface. The magnetic film includes Co of not more than Co/(Fe+Co)=50 at. %, as well as $\zeta$-Fe$_2$N. The magnetic film has a columnar crystal structure extending in a direction perpendicular to the substrate's main surface and perpendicular magnetic anisotropy by including $\zeta$-Fe$_2$N.

In accordance with a still further aspect of the present invention, the method of forming a perpendicular magnetic recording medium comprises the steps of heating a non-magnetic substrate having one main surface to a predetermined temperature, providing iron and cobalt vapor above the substrate's main surface from a direction orthogonal to the main surface, and also nitrogen plasma at the same time, so that a perpendicular magnetic recording medium is formed including Co of not more than Co/(Fe+Co)=50 at. %, as well as $\zeta$-Fe$_2$N, and having a columnar crystal structure extending in a direction perpendicular to the substrate's main surface and perpendicular magnetic anisotropy.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 13A-19B are graphs showing the saturation magnetization dependency of the perpendicular magnetic characteristics in various Fe-Co-N magnetic films.

DESCRIPTION OF THE PREFERRED EMBODIMENTS

Figure 1:
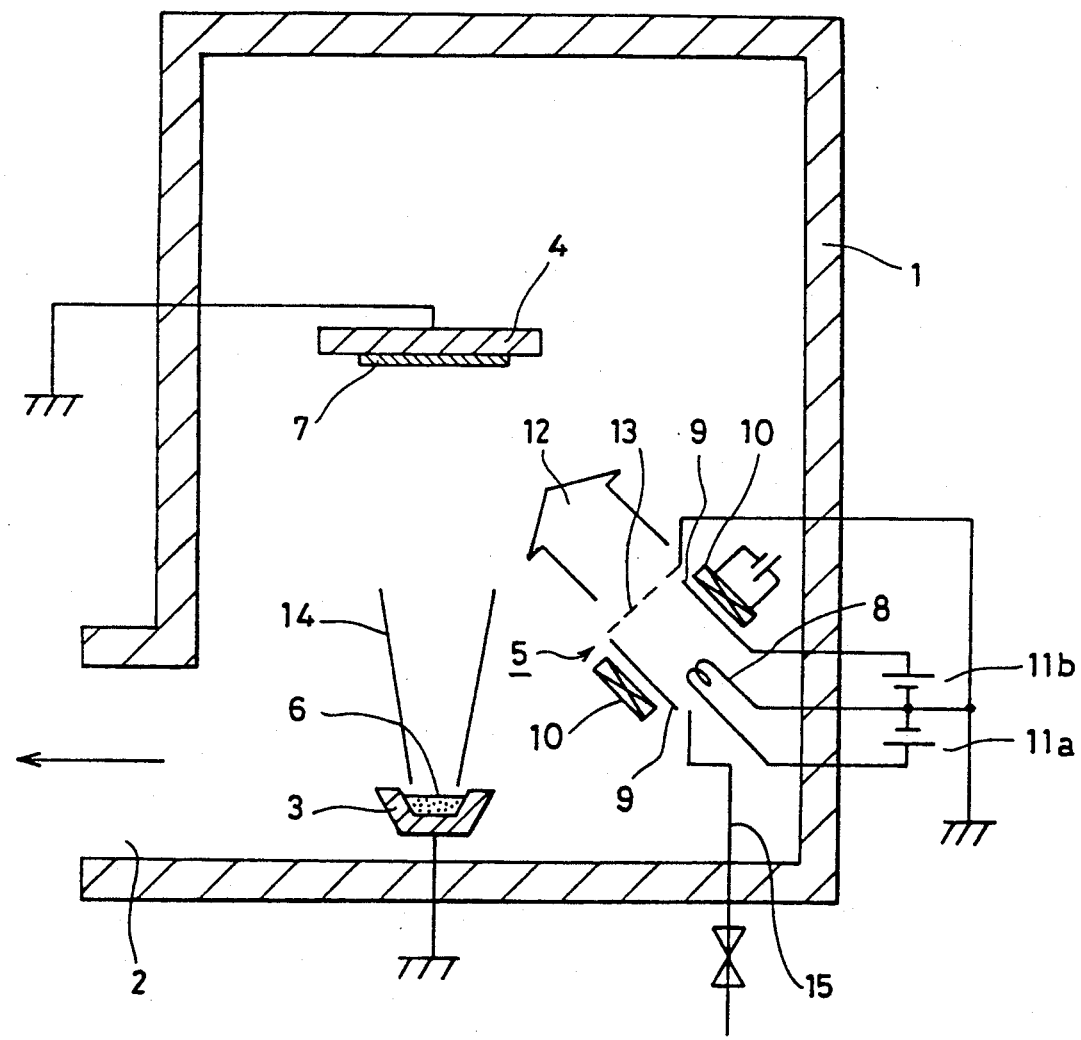
FIG. 1 is a sectional view of an ion-assist evaporation apparatus used in the production of the perpendicular magnetic recording medium in accordance with the present invention.

FIG. 1 shows a sectional view of an example of an ion-assist evaporation apparatus used for the production of a perpendicular magnetic recording medium in accordance with the present invention. A vacuum vessel 1 has its internal maintained in a high vacuum of less than or equal to $1 \times 10^{-6}$ torr by an evacuating system (not shown) through an evacuating port 2. A crucible 3, a substrate holder 4, and a plasma generating chamber 5 are provided inside vacuum vessel 1. Iron or iron-cobalt alloy 6 which is the evaporation source is contained in crucible 3. On the bottom side of substrate holder 4, a non-magnetic film substrate 7 is attached. Crucible 3 is disposed right below substrate 7. A heater (not shown) is provided inside substrate holder 4, whereby the temperature of substrate 7 is controlled by the heater.

Plasma generating chamber 5 comprises a cathode filament 8 and an anode cylinder 9, whereby a solenoid coil 10 is wound around anode cylinder 9. A current of 20–30 A is supplied to filament 8 by a direct current power supply 11a. A positive voltage of 100 V is applied to anode 9 by direct current power supply 11b. Grid 13 electrically connected to ground is mounted to the opening of plasma generating chamber 5 for discharging plasma 12. Grid 13 acts so as to generate pressure difference between the inside and outside of plasma generating chamber 5. Nitrogen gas is introduced into plasma generating chamber 5 through a pipe 15.

In the ion-assist evaporation apparatus of FIG. 1, the neutral nitrogen moleculars introduced into plasma generating chamber 5 through pipe 15 are ionized by colliding with thermoelectrons discharged from filament 8 and accelerated by anode 9. Nitrogen ions and electrons of low energy generated by this ionization are discharged from the opening of plasma generating chamber 5 by the magnetic field gradient formed by solenoid coil 10 and the pressure difference by grid 13. This discharged nitrogen plasma arrives at substrate 7 simultaneously with vapor 14 of Fe or Fe+Co from crucible 3.

The positive charge of nitrogen ion arriving at substrate 7 is neutralized by the electron in the plasma, so substrate 7 will not charge up. Also, since the kinetic energy of nitrogen ion and electron is as low as not more than 100 eV, the magnetic film of Fe-N or Fe-Co-N formed on substrate 7 does not generate thermal dissociation.

As the first embodiment of the present invention, a Fe-N magnetic film is formed on film substrate under the following Film Growth Condition I using the apparatus of FIG. 1.

FILM GROWTH CONDITION I

Figure 2:
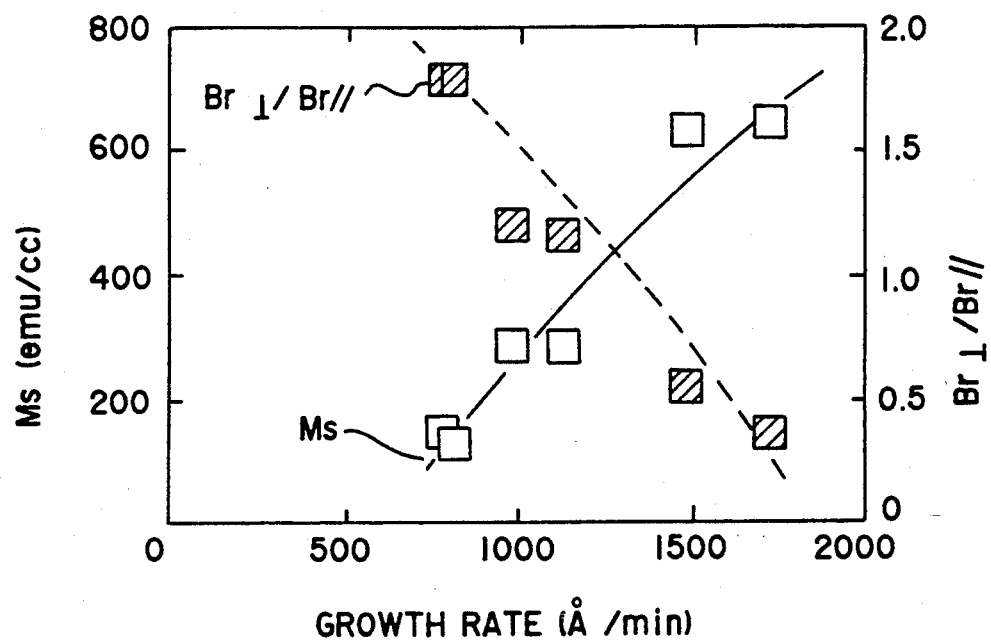
FIGS. 2-4 are graphs showing various magnetic characteristics in the Fe-N magnetic film formed in accordance with the first embodiment of the present invention.
Figure 3:
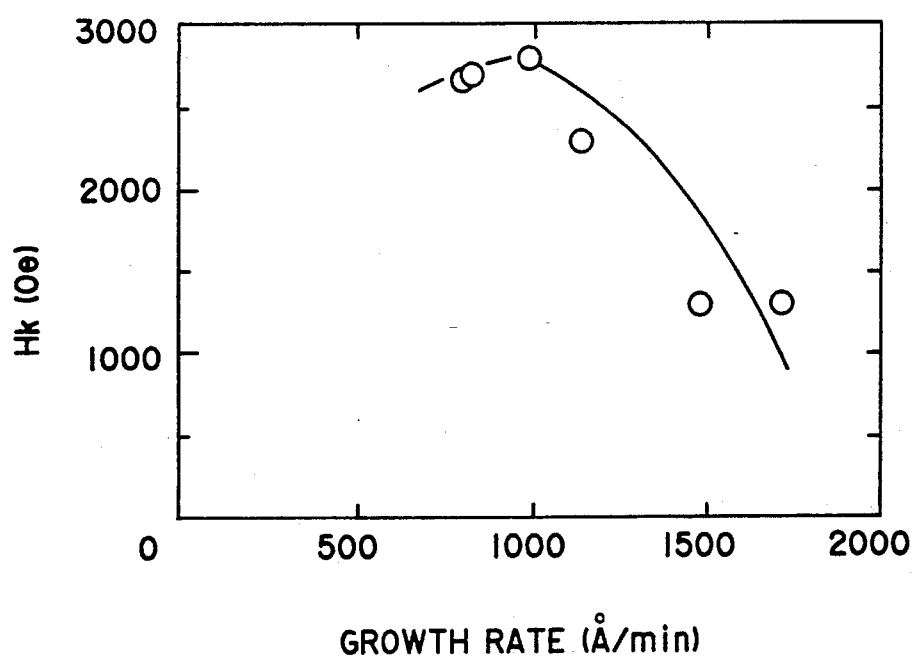
Figure 4:
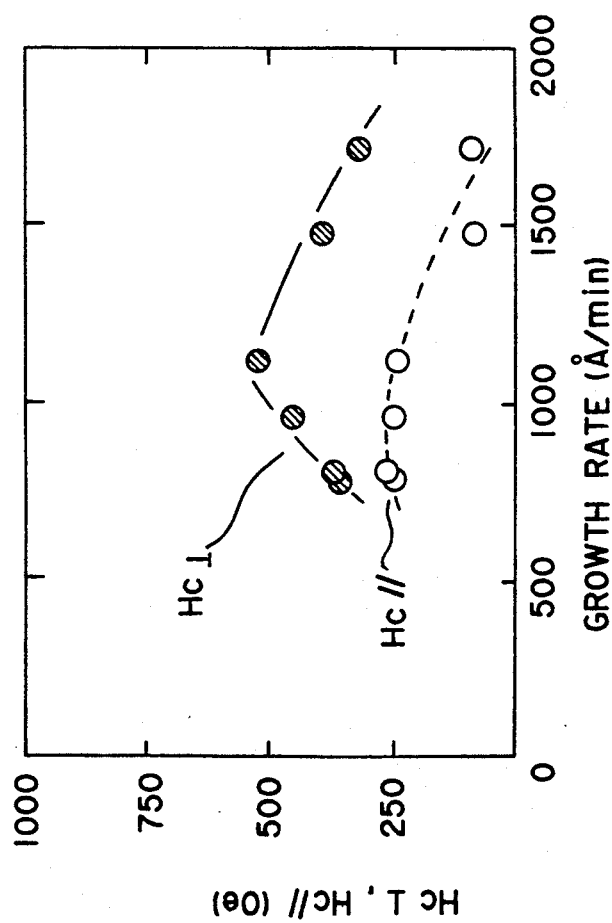

Back pressure: not more than $1 \times 10^{-6}$ torr
Nitrogen gas pressure: $2 \times 10^{-4}$ torr
Growth rate: 750–1750 Å/min
Nitrogen ion current density: 2.0 mA/cm$^2$
Incident angle of iron vapor: 90°
Substrate temperature: 100° C.
Kinetic energy of nitrogen ion: not more than 100 eV Referring to FIGS. 2–4, various magnetic characteristics of the Fe-N magnetic film formed under Film Growth Condition I are shown. In the graph of FIG. 2, the abscissa gives the film growth rate, the left ordinate axis gives the saturation magnetization Ms, and the right ordinate axis gives the remanence ratio $Br_\perp/Br_{//}$ of the perpendicular direction to the longitudinal direction with respect to the magnetic film. The solid line curve shows the change of saturation magnetization Ms depending on the film growth rate, while the broken line curve shows the change of remanence ratio $Br_\perp/Br_{//}$ depending on the film growth rate. In FIG. 3, the abscissa gives the film growth rate, while the ordinate gives the perpendicular anisotropy magnetic field Hk. In FIG. 4, the abscissa gives the film growth rate, while the ordinate gives coercive force $Hc_\perp$ of the perpendicular direction and coercive force $Hc_{//}$ of the parallel direction with respect to the magnetic film. The solid line curve shows the perpendicular coercive force $Hc_\perp$, while the broken line curve shows the parallel coercive force $Hc_{//}$.

It can be seen from FIGS. 2–4 that saturation magnetization Ms decreases, while the vertical magnetic characteristics such as remanence ratio $Br_\perp/Br_{//}$, perpendicular anisotropy magnetic field Hk, and perpendicular coercive force $Hc_\perp$ increase, in accordance with the decrease of film growth rate from 1750 Å/min. At the growth rate of 1000 Å/min, satisfactory perpendicular magnetic characteristics of a saturation magnetization Ms of 290 emu/cc, a remanence ratio $Br_\perp/Br_{//}$ of 1.2, a perpendicular anisotropy magnetic field Hk of 2800Oe, and a perpendicular coercive force $Hc_\perp$ of 450Oe are obtained.

Figure 5A:
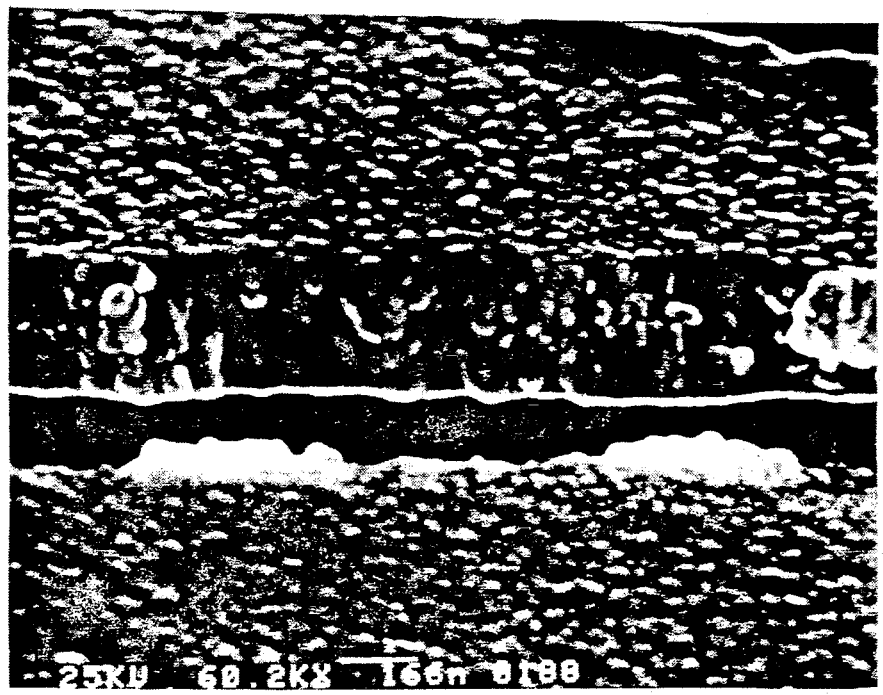
FIGS. 5A and 5B are scanning electron micrographs showing the crystal structure of the Fe-N magnetic film.
Figure 5B:
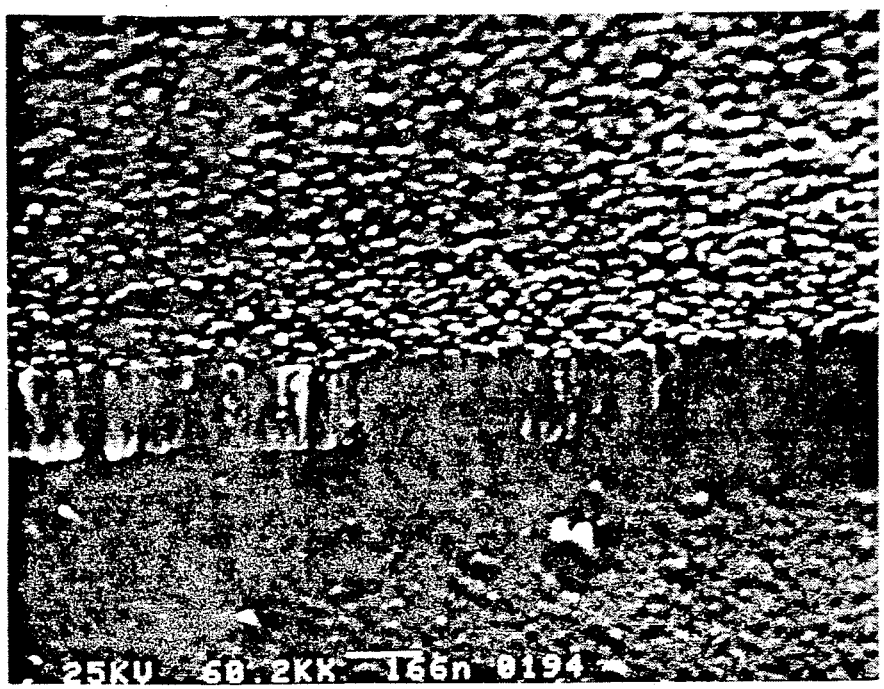

FIGS. 5A and 5B are scanning electron micrographs showing the crystal structure of the Fe-N magnetic films formed at the growth rates of 1750 Å/min and 1000 Å/min, respectively. The white scale bar at the bottom of each micrograph indicates the length of 166 nm. It can be seen from FIGS. 5A and 5B that there is no columnar crystal structure in the Fe-N magnetic film formed at the growth rate of 1750 Å/min, whereas a columnar crystal structure extending in a direction perpendicular to the film's surface is formed in the Fe-N magnetic film formed at the growth rate of 1000 Å/min having satisfactory perpendicular magnetic characteristics.

Figure 6B:
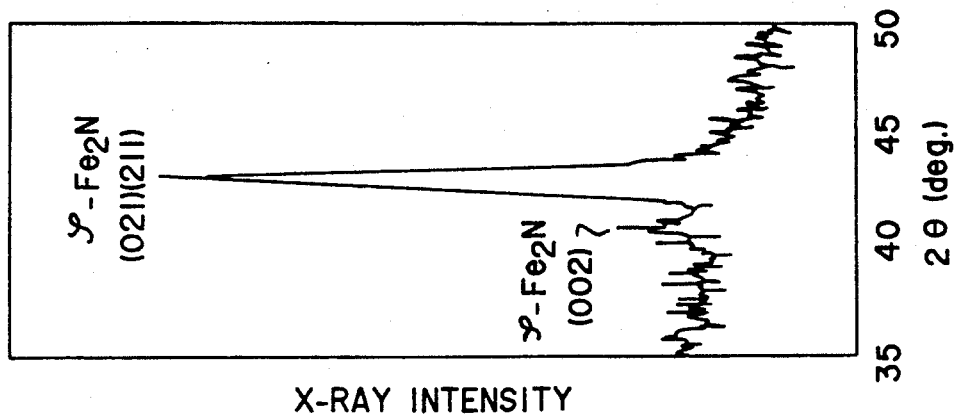
FIGS. 6A and 6B are graphs showing the X-ray diffraction intensity of the Fe-N magnetic film.
Figure 6A:
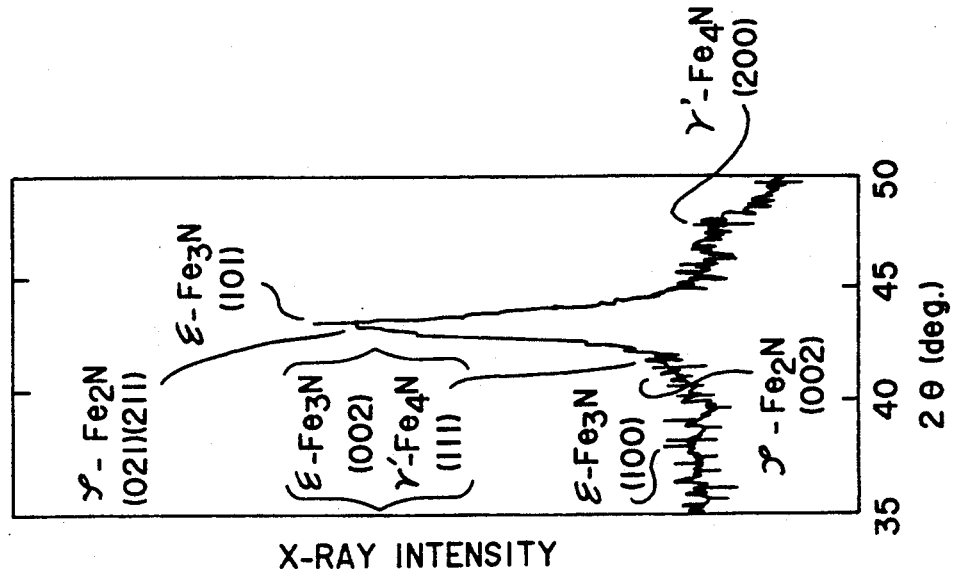

FIGS. 6A and 6B are graphs showing the results of the compositional analysis by X-ray diffraction of the Fe-N magnetic films formed at the growth rate of 1750 Å/min and 1000 Å/min, respectively. In these graphs, the abscissa represents the diffraction angle 2, while the ordinate represents the diffraction intensity. It can be seen from FIGS. 6A and 6B that the diffraction pattern of the Fe-N magnetic film formed at the growth rate of 1750 Å/min is a mixed pattern of the phases of $\epsilon$-$Fe_3N$, $\zeta$-$Fe_2N$, and $\gamma'$-$Fe_4N$, whereas a diffraction pattern indicating dominance of $\gamma$-$Fe_2N$ phase which is iron nitride having a tetragonal crystal structure appears in the Fe-N magnetic film formed at the growth rate of 1000 Å/min having satisfactory perpendicular magnetic characteristics. This means that $\zeta$-$Fe_2N$ has an important role in the growth of columnar crystal structure and enhances the perpendicular magnetic anisotropy.

Figure 7:
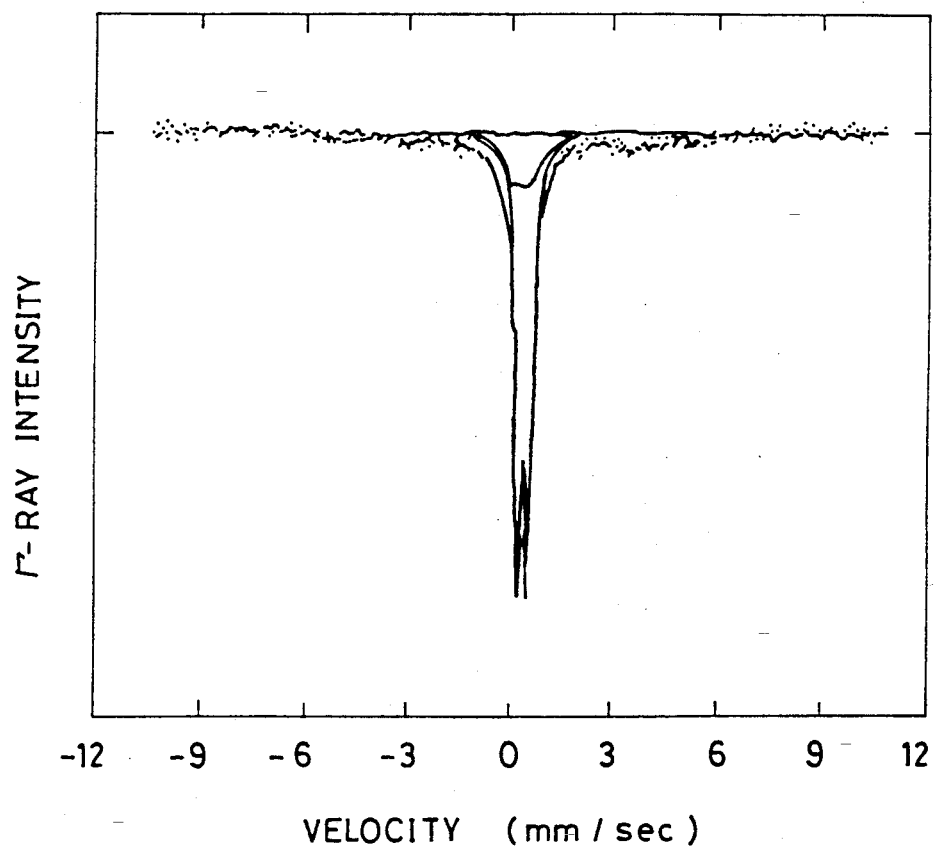
FIG. 7 is a graph showing the Mossbauer spectroscopy analysis of the Fe-N magnetic film.

FIG. 7 is a graph showing the Mössbauer spectroscopy analysis of the Fe-N magnetic film with satisfactory perpendicular magnetic characteristics at the growth rate of 1000 Å/min. The abscissa represents the velocity of the gamma-ray source, while the ordinate represents the intensity of the gamma-ray transmitting the magnetic film. That is to say, the low gamma-ray transmitted intensity represents the absorption of the gamma-ray by the magnetic film. According to the Mössbauer spectroscopy analysis, the composition of the Fe-N magnetic film formed at the growth rate of 1000 Å/min is as below.

| Fe—N Magnetic Film Composition | | |
|---|---|---|
| Paramagnetism (room temperature) | $\zeta$-Fe$_2$N | 62% |
| Paramagnetism (room temperature) | $\epsilon$-Fe$_x$N $(2 \leq x \leq 3)$ | 22% |
| Ferromagnetism (room temperature) | $\alpha$-Fe | 8% |
| Ferromagnetism (room temperature) | $\gamma'$-Fe$_4$N | 8% |

It can be seen from the results of this compositional analysis that though the perpendicular magnetic anisotropy of the Fe-N magnetic film grows significant in accordance with the increase of $\zeta$-Fe$_2$N, the magnetization itself arises from the ferromagnetism of $\alpha$-Fe and $\gamma'$-Fe$_4$N.

On examining the nitrogen content of Fe-N magnetic film formed under Film Growth Condition I by XPS (X-ray photoelectron spectroscopy), it has been found that that nitrogen content increases as the film growth rate decreases, and the nitrogen content of the magnetic film achieving satisfactory magnetic characteristics is 23 at. % at the growth rate of 1000 Å/min. This coincides with the increase of $\zeta$-Fe$_2$N in accordance with the decrease of the growth rate of the magnetic film.

Figure 8:
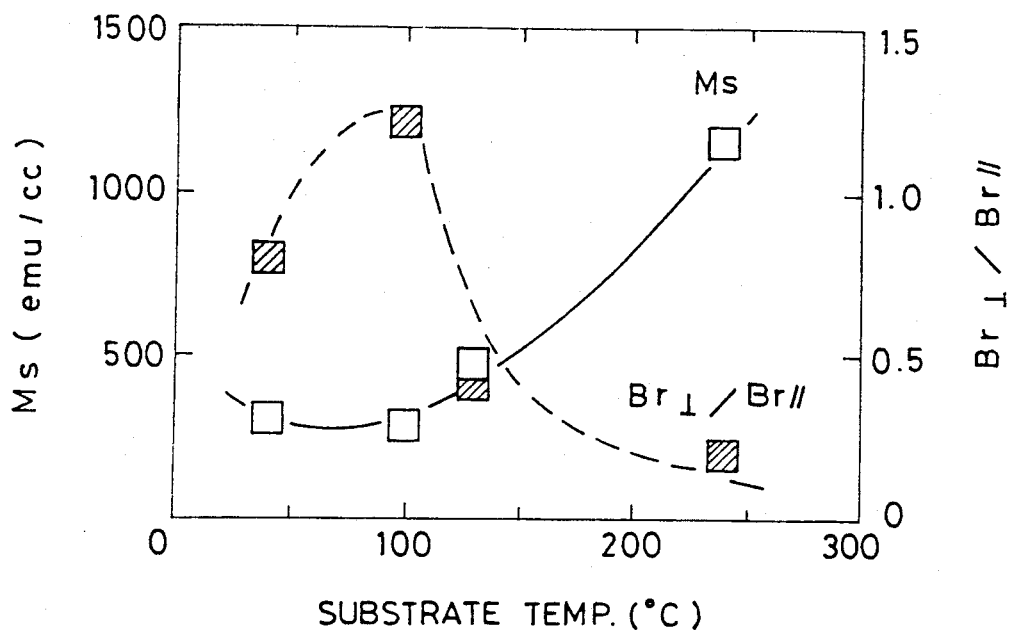
FIGS. 8 and 9 are graphs showing the substrate temperature dependency of the magnetic characteristics of the Fe-N magnetic film.
Figure 9:
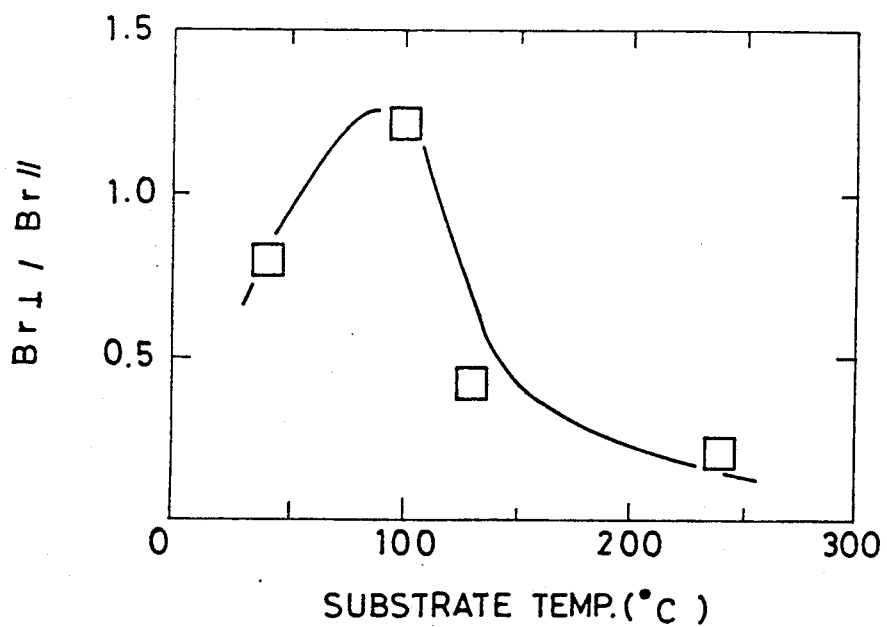

FIGS. 8 and 9 show the substrate temperature dependency of the magnetic characteristics of the Fe-N magnetic film. The magnetic film is formed under Film Growth Condition I except that the substrate temperature is varied from 40° C. to 240° C. at the growth rate of 1000 Å/min. In FIG. 8, the abscissa represents the substrate temperature, the left ordinate axis represents saturation magnetization Ms, and the right ordinate axis represents the remanence ratio Br$\perp$/Br// of the direction perpendicular to the longitudinal direction with respect to the magnetic film. The solid line curve shows the change of saturation magnetization Ms depending on the substrate temperature, while the broken line curve shows the change of the remanence ratio Br$\perp$/Br// depending on the substrate temperature. In FIG. 9, the abscissa represents the substrate temperature, while the ordinate represents the perpendicular anistropy magnetic field Hk.

It can be seen from FIGS. 8 and 9 that the perpendicular magnetic characteristics such as the remanence ratio Br$\perp$/Br// of the perpendicular direction to the longitudinal direction, and the perpendicular anisotropy magnetic field Hk show the most satisfactory values in a Fe-N magnetic film formed at a substrate temperature of approximately 100° C.

Figure 10:
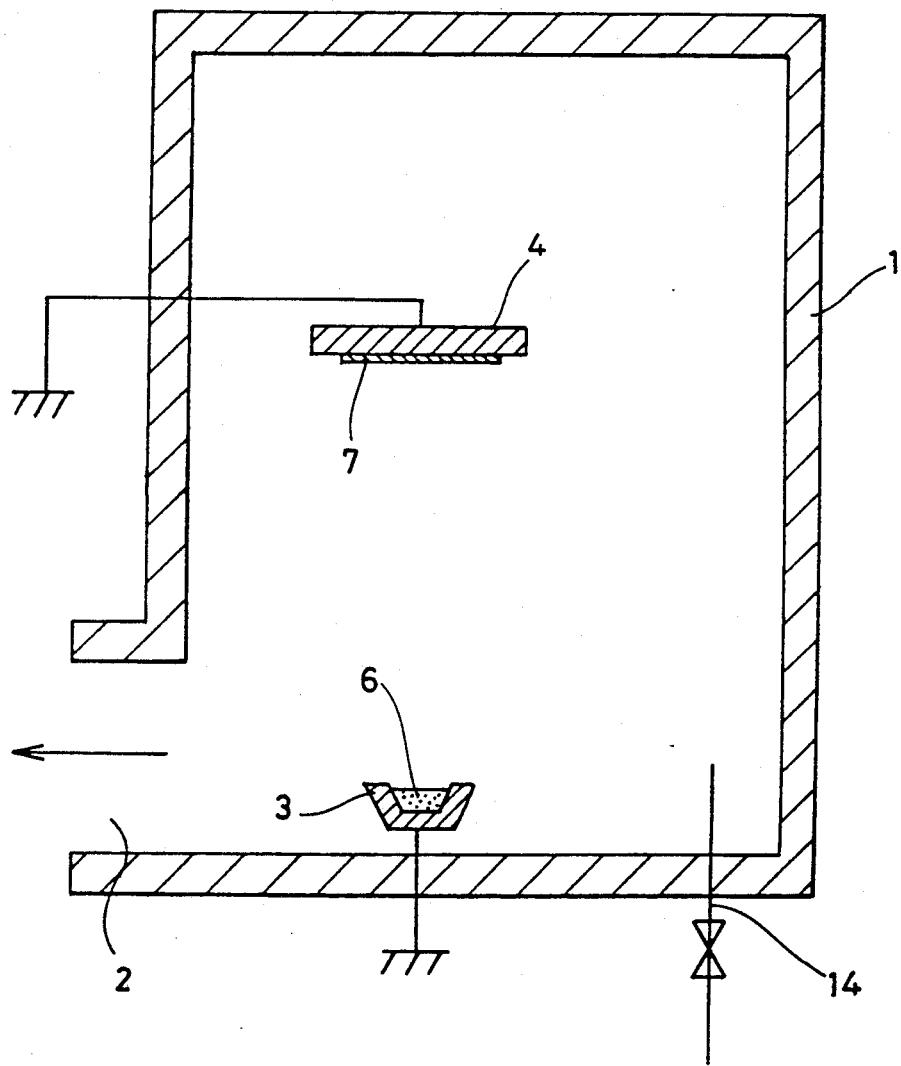
FIG. 10 is a sectional view showing a general vacuum evaporation apparatus.

A Fe-N magnetic film is formed using a general vacuum evaporation apparatus as shown in FIG. 10 for comparison. The same elements corresponding to those of FIG. 1 have the same references in FIG. 10. The Fe-N magnetic film is formed under the following Film Growth Condition II.

FILM GROWTH CONDITION II

Back pressure: not more than $1 \times 10^{-6}$ torr
Nitrogen gas pressure: $2 \times 10^{-4}$ torr
Growth rate: 1000 Å/min
Incident angle of iron vapor: 90°
Substrate temperature: 100° C.

The following Table 1 shows the magnetic characteristics of the Fe-N magnetic film of the first embodiment formed under Film Growth Condition I, and a comparative example of Fe-N magnetic film formed under Film Growth Condition II, at the growth rate of 1000 Å/min and at the substrate temperature of 100° C.

TABLE 1

| | Nitrogen Ion Current J (mA/cm$^2$) | Saturation Magnetization Ms (emu/cc) | Remanence Ratio Br$\perp$/Br// | Perpendicular Anisotrophy Magnetic Field Hk (Oe) | Perpendicular Coercive Force Hc$\perp$ (Oe) | Longitudinal Coercive Force Hc// (Oe) |
|---|---|---|---|---|---|---|
| First Embodiment Example | 2.0 | 290 | 1.20 | 2800 | 450 | 250 |
| Comparative Example | 0 | 1700 | 0.15 | 300 | 310 | 60 |

Observing the scanning electron micrographs of the comparative example of the Fe-N magnetic film, there was no columnar crystal structure, and only diffraction pattern of $\alpha$-Fe phase was seen by X-ray diffraction.

Figure 11:
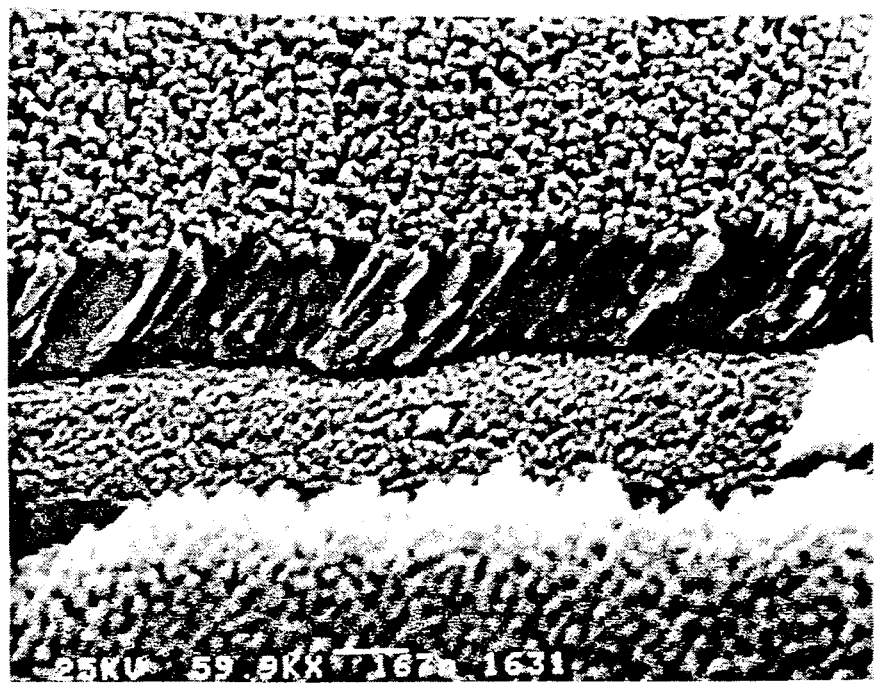
FIG. 11 is a scanning electron micrograph of the Fe-N magnetic film formed by providing iron vapor to the substrate's surface in an oblique direction.

Furthermore, as a second comparative example, a Fe-N magnetic film was formed by providing iron vapor in an oblique direction with respect to the surface of substrate 7 by tilting substrate holder 4 of the apparatus of FIG. 1 by a predetermined angle. The second comparative example of Fe-N magnetic film has a columnar crystal structure growing obliquely with respect to the substrate's surface, as shown in the scanning electron micrograph of FIG. 11, with a nitrogen content of 16 at. %. However, the remanence ratio Br$\perp$/Br// of the perpendicular direction to the longitudinal direction was about 0.30 in the Fe-N magnetic film of the second comparative example, with almost no perpendicular magnetic anisotropy.

As a second embodiment, a Fe-Co-N magnetic film is formed on a film substrate under the following Film Growth Condition III using the apparatus of FIG. 1.

| Film Growth Condition III | |
|---|---|
| Back pressure: | not more than $1 \times 10^{-6}$ torr |
| Nitrogen gas pressure: | $2 \times 10^{-4}$ torr |
| Growth rate: | 100–750 Å/min |
| Nitrogen ion current density: | 2.0 mA/cm$^2$ |
| Nitrogen ion kinetic energy: | not more than 100 eV |
| Incident angle of iron cobalt vapor: | 90° |
| Substrate temperature: | 100° C. |
| FeCo composition ratio: (alloy composition ratio of vaporization source) | Fe$_{100}$, Fe$_{90}$Co$_{10}$, Fe$_{70}$Co$_{30}$, Fe$_{60}$Co$_{40}$, Fe$_{50}$Co$_{50}$, Fe$_{30}$Co$_{70}$, Co$_{100}$ |

Figure 12B:
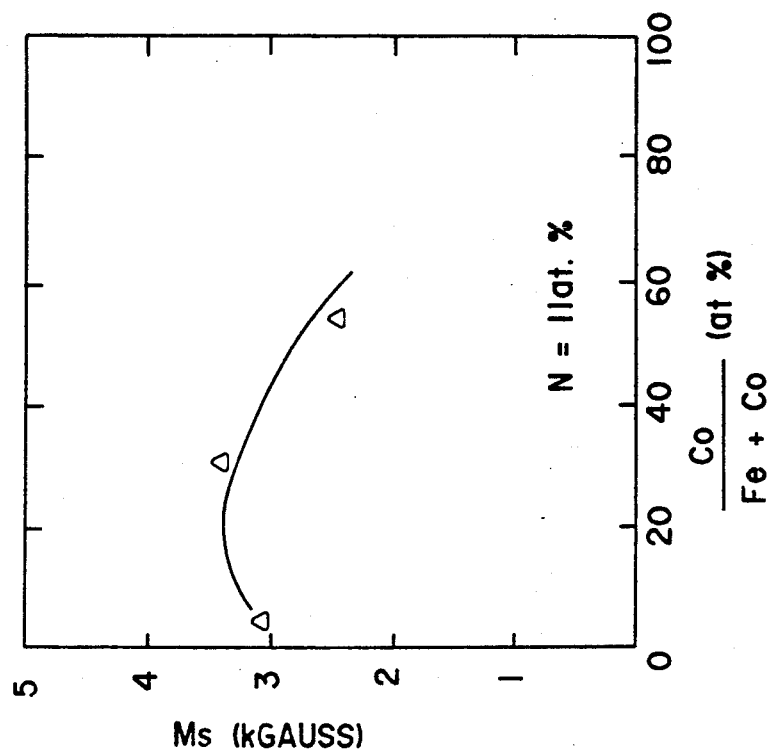
FIGS. 12A and 12B are graphs showing various magnetic characteristics in the Fe-Co-N magnetic film.
Figure 12A:
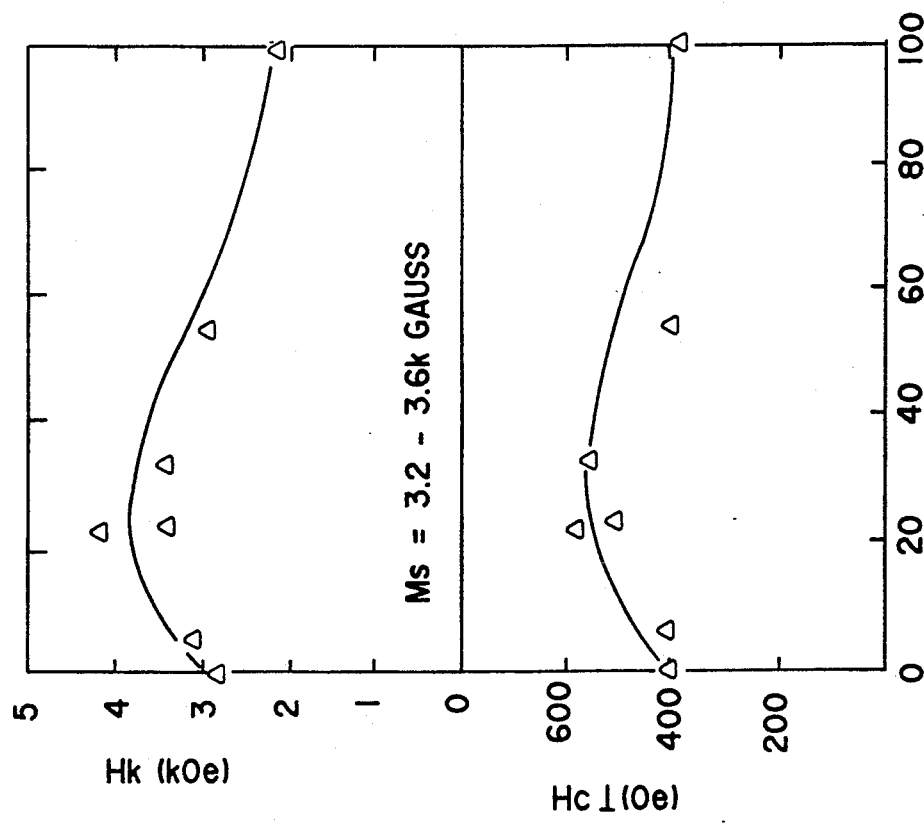

Referring to FIGS. 12A and 12B, various magnetic characteristics of the Fe-Co-N magnetic film formed under Film Growth Condition III are shown. In the graph of FIG. 12A, the abscissa represents the cobalt content Co/(Fe+Co) in atom %, while the ordinate represents perpendicular anisotropy magnetic field Hk and perpendicular coercive force Hc$_\perp$. The cobalt content in the magnetic film is measured by XPS analysis. In FIG. 12B, the abscissa represents cobalt content, while the ordinate represents saturation magnetization Ms. FIG. 12A shows the data of a Fe-Co-N magnetic film where saturation magnetization Ms is 3.2-3.6 kGauss, while FIG. 12B shows the data of a Fe-Co-N magnetic film where nitrogen content is 11 at. %.

It can be seen from FIG. 12A that perpendicular anisotropy magnetic field Hk of the Fe-Co-N magnetic film increases from 2.8 kOe where Co content is 0 in proportion to the Co content, and shows the maximum value of 4.0 kOe at the time of Fe$_{77}$Co$_{23}$-N magnetic film in which the atomic composition ratio of Fe/Co is 77/23. If the Co content further increases, perpendicular anisotropy magnetic film Hk decreases. If the Co content exceeds 60 at. %, perpendicular anisotropy magnetic field Hk will be lower than where Co content is 0. Considering the equation of Hk=2 Ku/Ms representing the relation between perpendicular anisotropy magnetic field Hk and anisotropy energy Ku, it is understood that perpendicular anisotropy magnetic field Hk improves because of the increase of anisotropy energy Ku of the magnetic film in accordance with the addition of Co (provided that it is within the range of 0-32 at. %). Perpendicular anisotropy magnetic field Hk of the Co-N magnetic film is 2.3 kOe, which is a low value compared with that of the Fe-N magnetic field.

The Co content dependency of perpendicular coercive force Hc$_\perp$ of the Fe-Co-N magnetic film shows a tendency similar to that of perpendicular anisotropy magnetic field Hk, with the maximum value of 600 Oe at a Co content of approximately 23 at. %, and having a value higher than that of the Fe-N magnetic film at a Co content of not more than 80 at. %.

A Co-Cr perpendicular magnetic tape having the magnetic characteristics of Hk=2.2 kOe, Hc$_\perp$=500 Oe, and Ms=7.2 kGauss is known (refer to page 63, Table 2 of "Journal of Japanese Applied Magnetism Society" Volume 12, 1988). From the standpoint of electromagnetic converting characteristic, a perpendicular anisotropy magnetic field Hk of this degree is appropriate in this Co-Cr perpendicular magnetic tape, and saturation magnetization Ms is designed to be relatively high. This implies that the magnitude of saturation magnetization Ms is critical in a magnetic film having perpendicular anisotropy magnetic field Hk of the same degree.

It can be seen from FIG. 12B that saturation magnetization Ms of the Fe-Co-N magnetic film shows a maximum value of approximately 3.4 kGauss at a Co content of approximately 25 at. %, with a value higher than that of the Fe-N magnetic field at a Co content of not more than 50 at. %.

Thus, when Co/(Fe+Co) of Co content is not more than 50 at. %, that is, in a Fe-Co-N magnetic field with the atomic composition ratio of iron to cobalt represented by Fe$_{100-x}$Co$_x$ (0<x<50), perpendicular anisotropy magnetic field Hk, perpendicular coercive force Hc$^\perp$, and saturation magnetization Ms all are improved compared with those of the Fe-N magnetic film.

FIGS. 13A-19B show the various saturation magnetization dependency of perpendicular magnetic characteristics in the Fe-Co-N magnetic film formed under Film Growth Condition III. FIGS. 13A, 14A, 15A, 16A, 17A, 18A, and 19A show the changes in perpendicular anisotropy magnetic field Hk depending on saturation magnetization Ms of the magnetic films of Fe-N, Fe$_{94}$Co$_6$-N, Fe$_{76}$Co$_{24}$-N, Fe$_{77}$Co$_{23}$-N, Fe$_{66}$Co$_{34}$-N, Fe$_{45}$Co$_{55}$-N and Co-N, respectively. FIGS. 13B, 14B, 15B, 16B, 17B, 18B and 19B show the changes in perpendicular coercive force Hc$_\perp$ depending on saturation magnetization Ms of the magnetic films of Fe-N, Fe$_{94}$Co$_6$-N, Fe$_{76}$Co$_{24}$-N, Fe$_{77}$Co$_{23}$-N, Fe$_{66}$Co$_{34}$-N, Fe$_{45}$Co$_{55}$-N and Co-N, respectively.

Figures 13A, 13B:
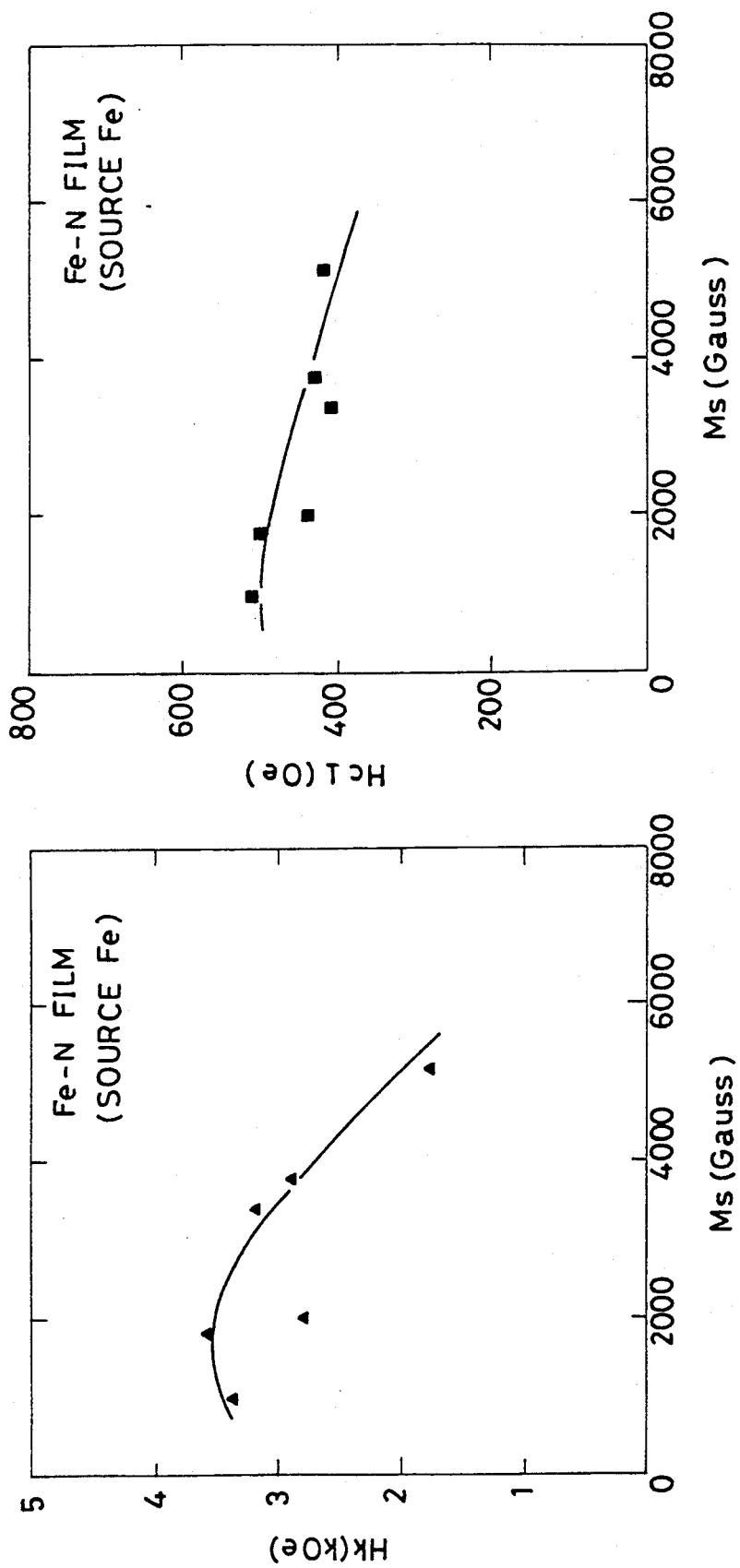
Figure 14B:
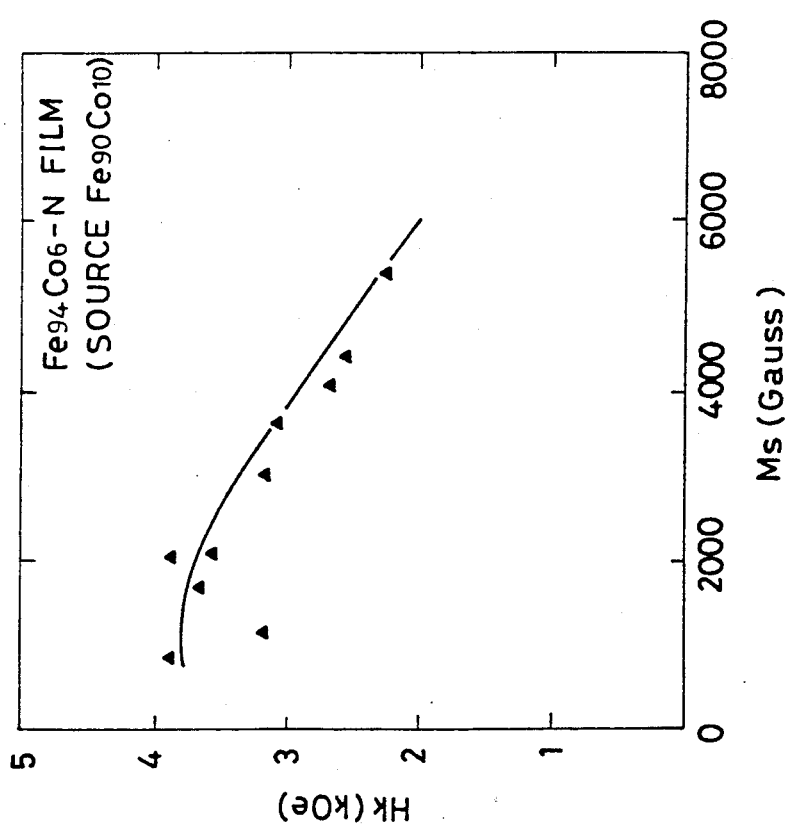
Figure 14A:
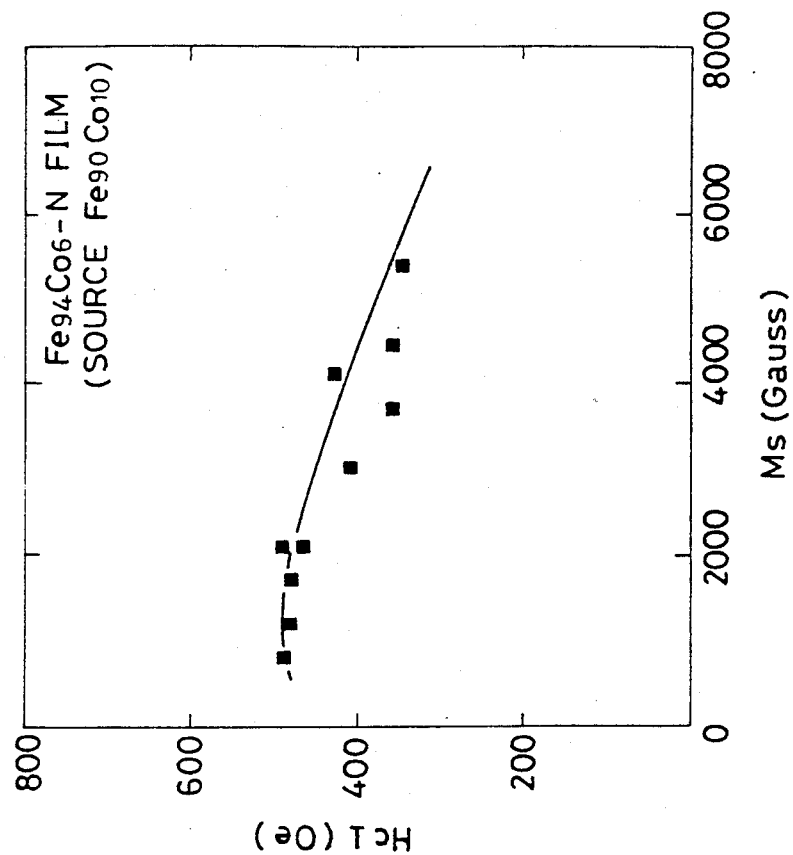
Figure 15B:
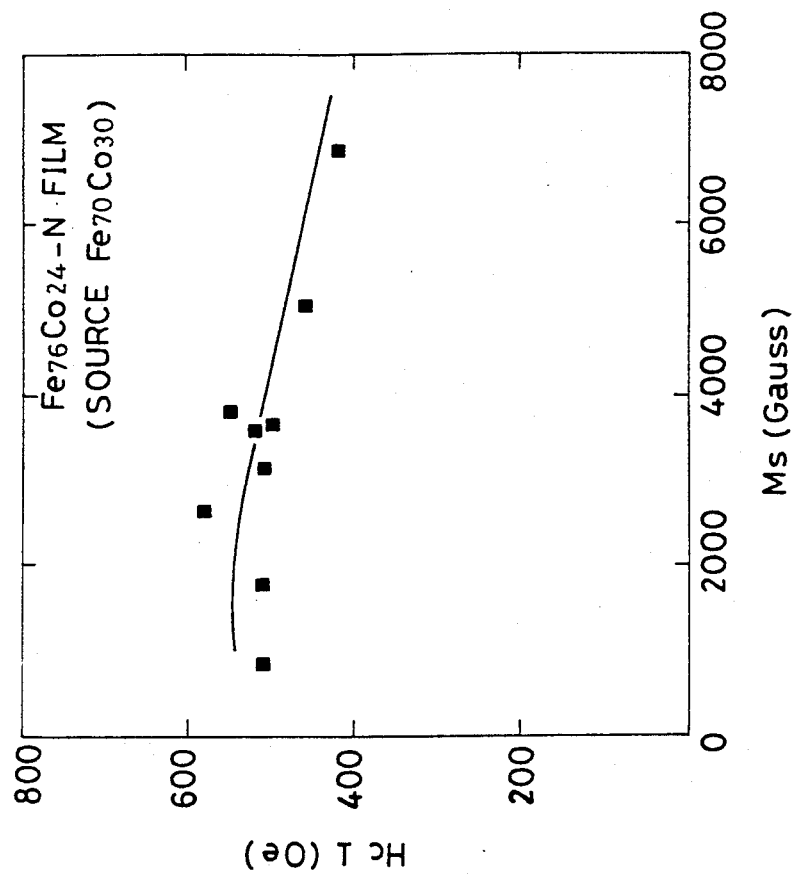
Figure 15A:
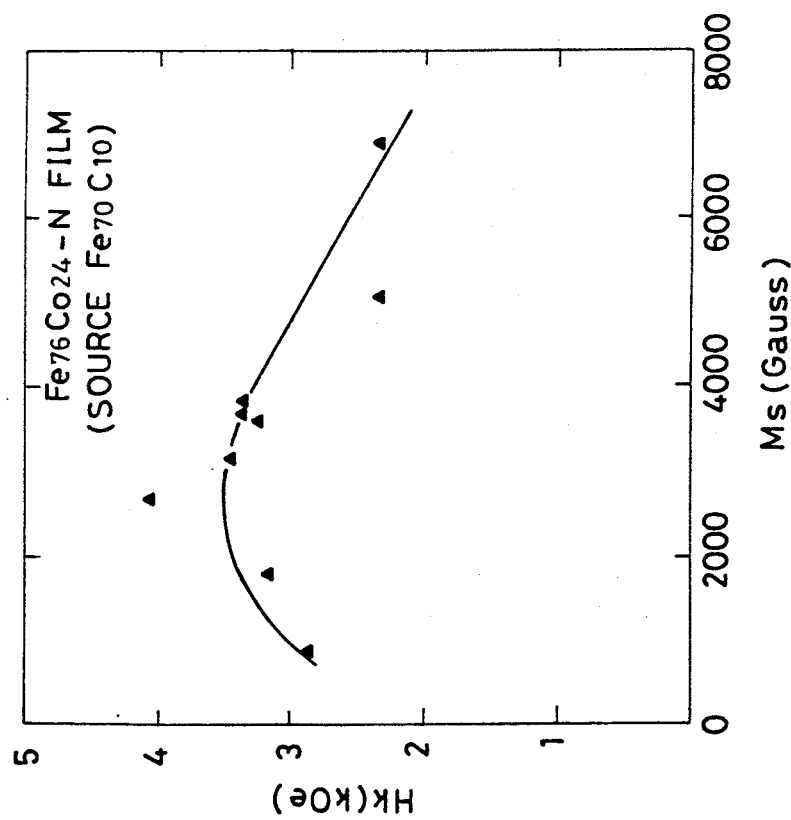
Figure 16B:
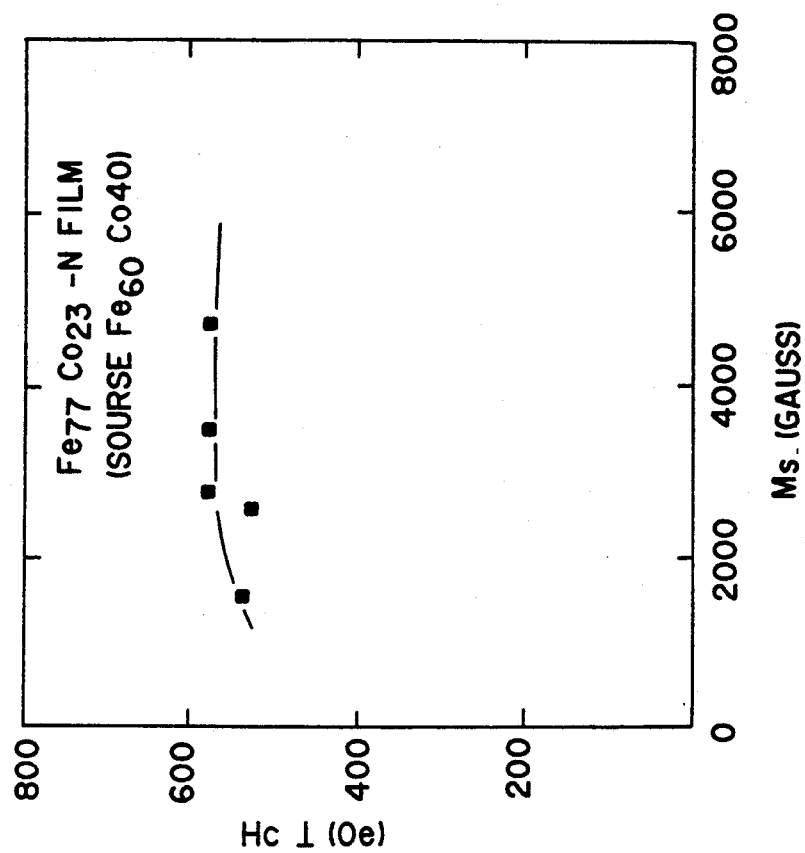
Figure 16A:
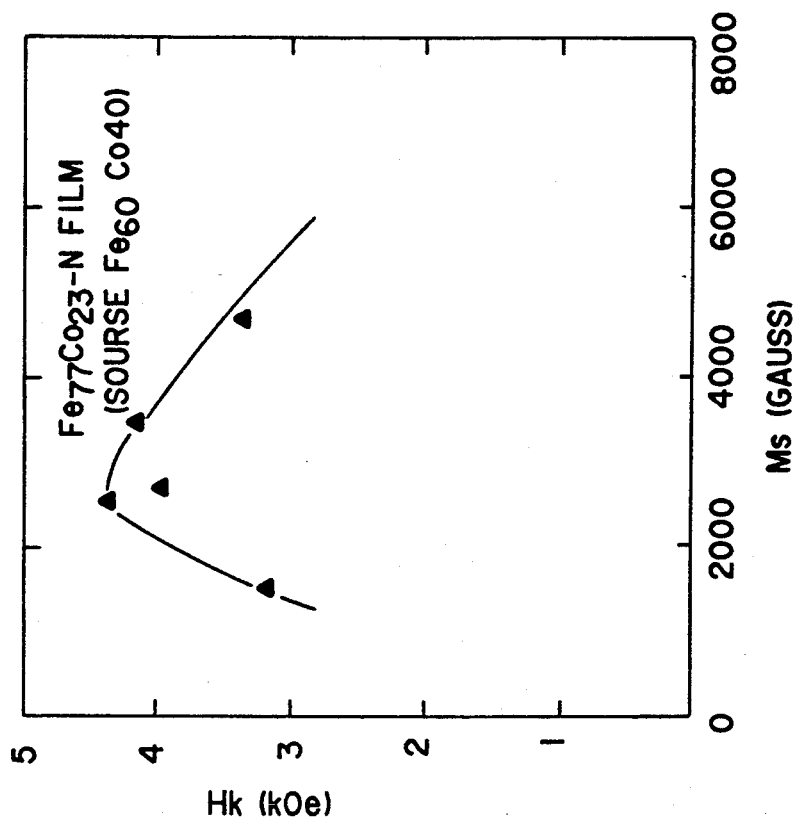
Figure 17B:
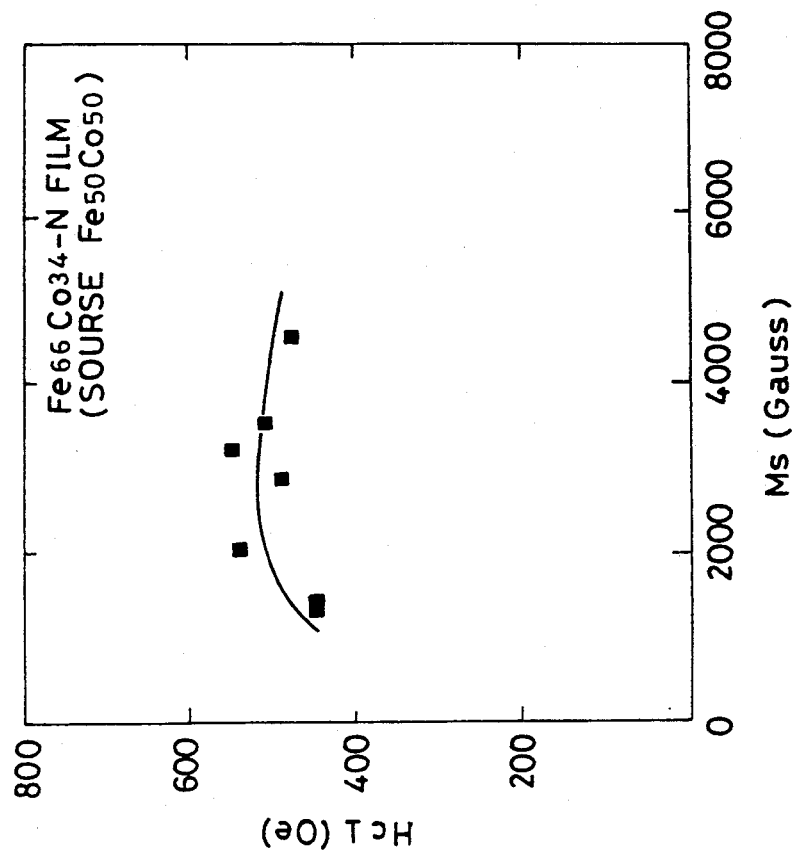
Figure 17A:
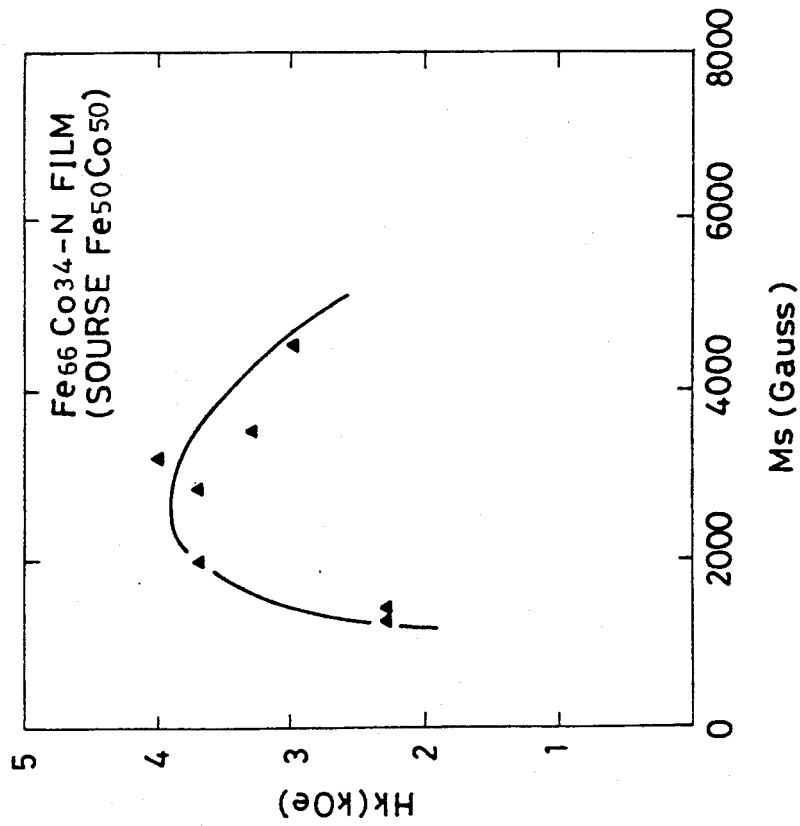
Figures 18A, 18B:
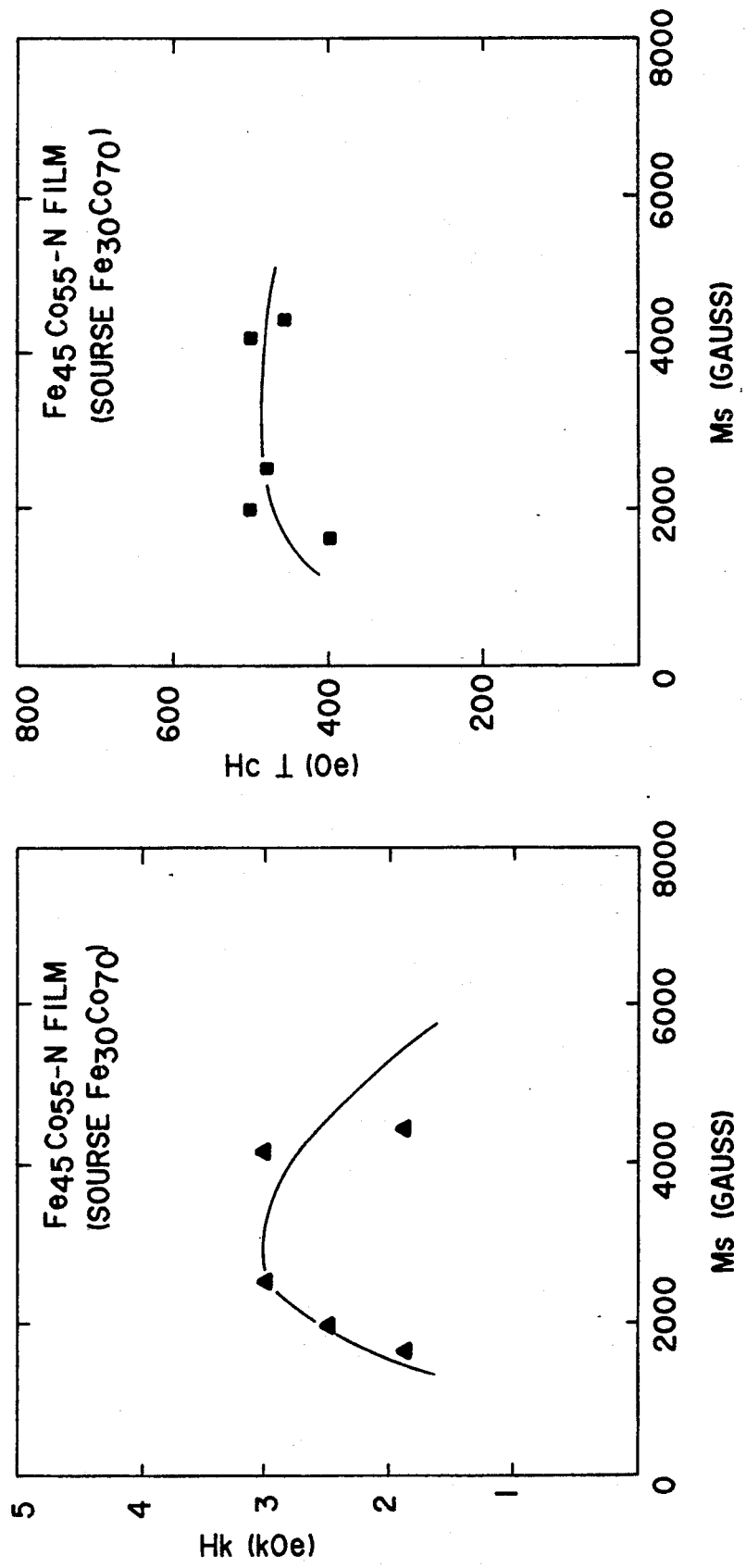
Figures 19A, 19B:
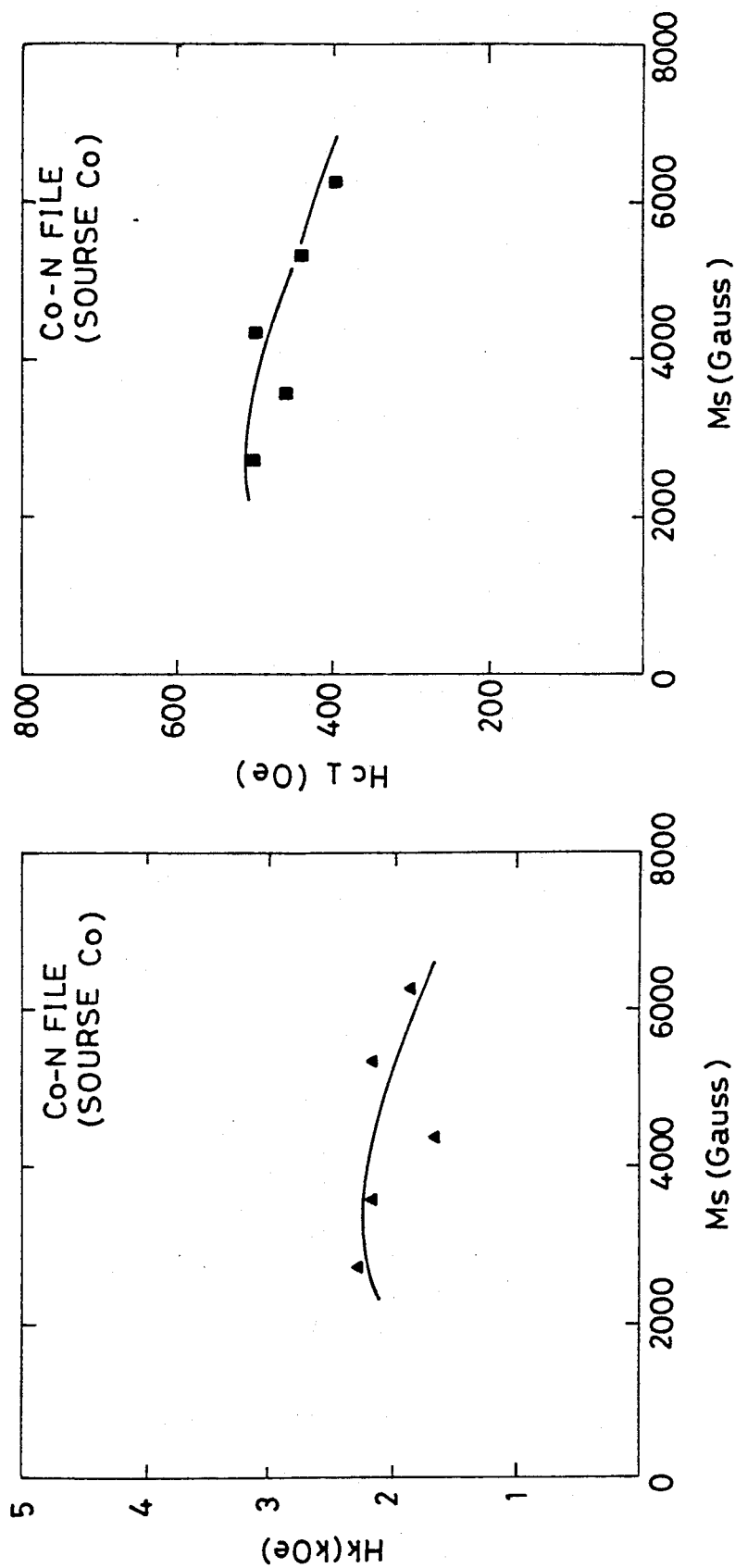

In comparison with the perpendicular magnetic characteristics of the Fe-N magnetic film shown in FIGS. 13A and 13B, it can be seen in the Fe$_{94}$Co$_6$-N magnetic film shown in FIGS. 14A and 14B that there is almost no change in perpendicular coercive force Hc$_\perp$, but the perpendicular anisotropy magnetic field Hk is improved, where saturation magnetization Ms is in the range of 2000-5000 Gauss. Regarding the magnetic films of Fe$_{76}$Co$_{24}$-N, Fe$_{77}$Co$_{23}$-N, and Fe$_{66}$Co$_{34}$-N shown in FIGS. 15A-17B, both perpendicular anisotropy magnetic field Hk and perpendicular coercive force Hc$_\perp$ are improved, where saturation magnetization Ms is in the range of 2000-5000 Gauss, in comparison with the Fe-N magnetic film. Regarding the magnetic films of Fe$_{45}$Co$_{55}$-N and Co-N shown in FIGS. 18A and 19B, perpendicular anisotropy magnetic field Hk significantly deteriorates in comparison with the Fe-N magnetic film.

That is to say, the perpendicular anisotrophy magnetic field Hk of the Fe-Co-N magnetic film having an atomic composition ratio of Fe:Co within the range of 94:6 to 66:34 is improved in comparison with the Fe-N magnetic film, where saturation magnetization Ms is within the range of 2000-5000 Gauss. Particularly, it can be seen that both perpendicular anisotropy magnetic field Hk and perpendicular coercive force Hc$_\perp$ are improved in the Fe-Co-N magnetic film having on atomic composition ratio of Fe:Co within the range of 77:23 to 66:34, in comparison with the Fe-N magnetic film.

Figure 20A:
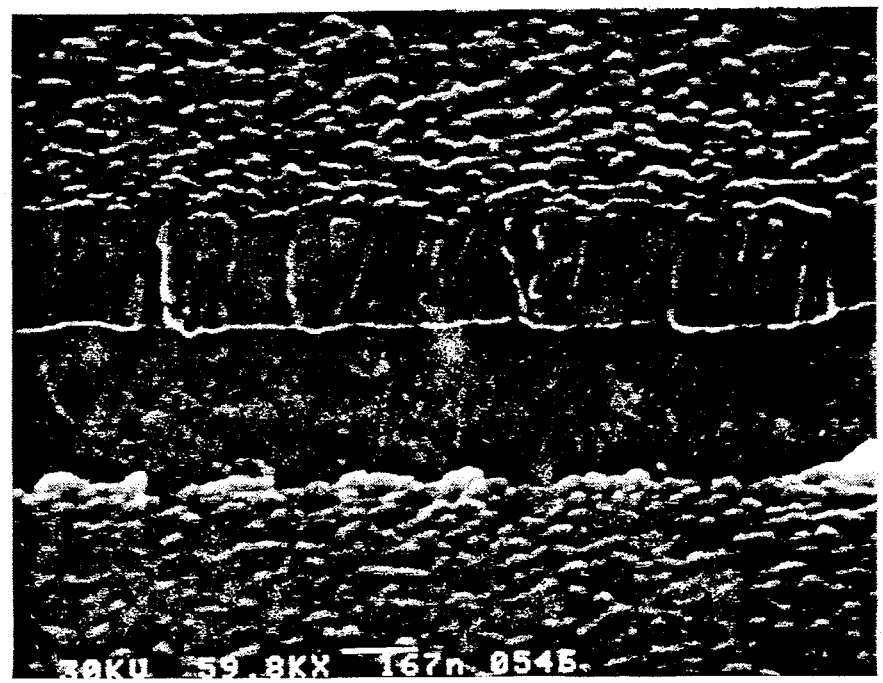
FIGS. 20A and 20B are scanning electron micrographs showing the crystal structure of the magnetic films of $Fe_{68}Co_{32}$-N and Co-N, respectively.
Figure 20B:
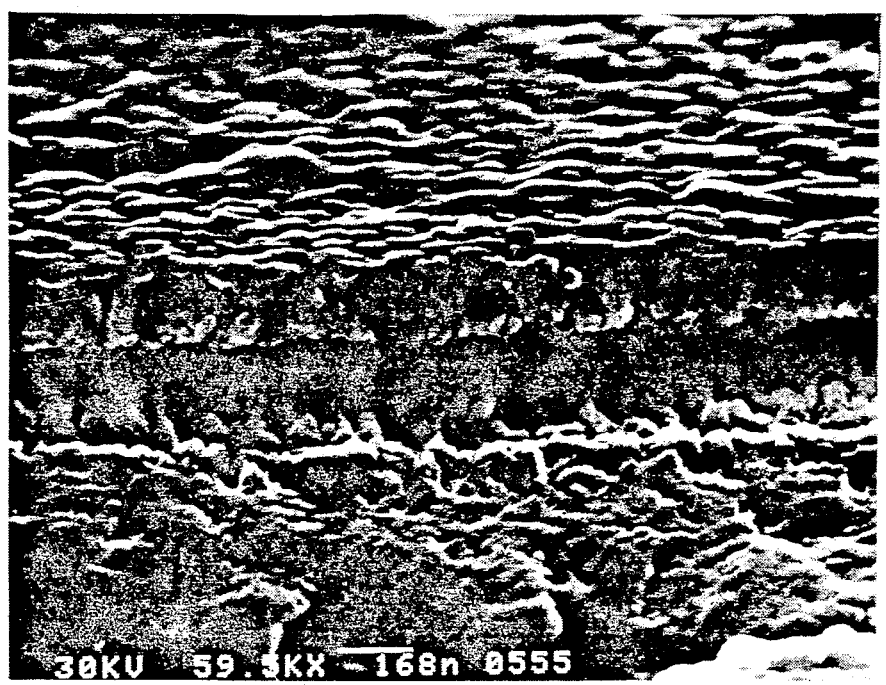

FIGS. 20A and 20B are scanning electron micrographs showing the crystal structures of the magnetic films of Fe$_{68}$Co$_{32}$-N and Co-N, respectively. It can be observed from FIG. 20A that micro columnar crystal grow in a direction perpendicular to the substrate's surface in the Fe$_{68}$Co$_{32}$-N magnetic film having satisfactory perpendicular anisotropy magnetic field, as in the Fe-N magnetic film shown in FIG. 5B. The dimension of the columnar crystal in the Fe$_{68}$Co$_{32}$-N magnetic film of FIG. 20A is approximately 500 Å, which is similar to that in the Fe-N magnetic film of FIG. 5B. It is observed from FIG. 20B that micro columnar crystal structures are not clear in the Co-N magnetic film where perpendicular anisotropy magnetic field is relatively small, with columnless crystal structure.

From the above results, it is appreciated that the formation of clear columnar crystal structure in the cross section of the magnetic film is essential for the Fe-Co-N magnetic film to have satisfactory perpendicular magnetic anisotropy, likewise as in the case of the Fe-N magnetic film. This columnar crystal structure is enhanced by the increase of $\zeta$-Fe$_2$N.

The following Table 2 shows the magnetic characteristics of the magnetic films shown in FIGS. 5B, 20A, and 20B.

TABLE 2

| Fe—N | Fe$_{68}$Co$_{32}$—N | Co—N |
|---|---|---|
| Hk: 2.8 kOe | Hk: 4.0 kOe | Hk: 2.3 kOe |
| Hc$_\perp$: 410 Oe | Hc$_\perp$: 6000 Oe | Hc$_\perp$: 5000 Oe |
| Ms: 290 emu/cc | Ms: 170 emu/cc | Ms: 217 emu/cc |

Figures 21A, 21B, 21C:
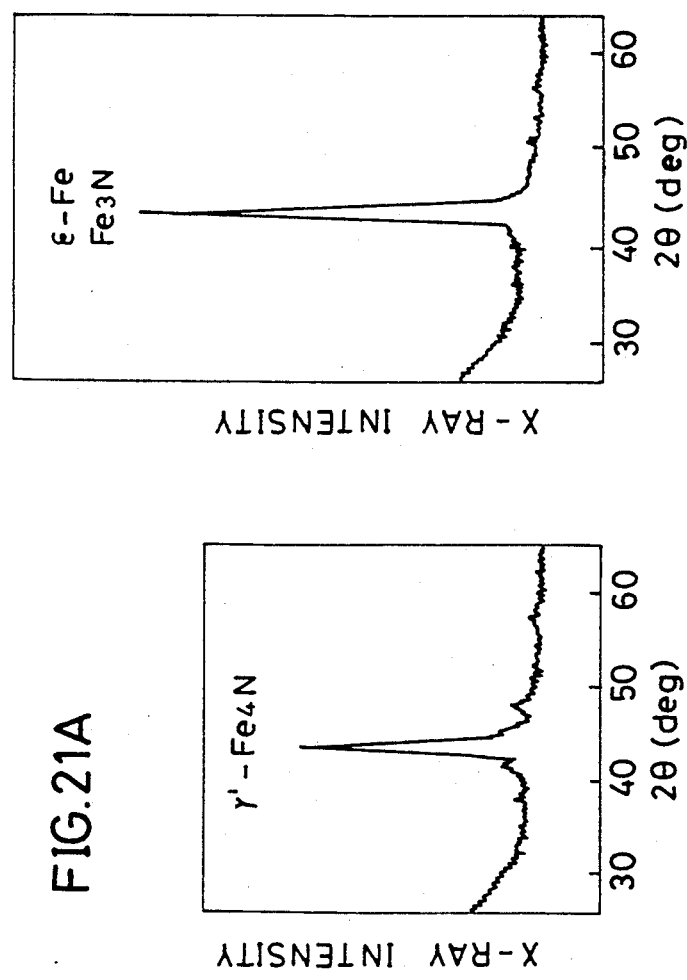
FIGS. 21A–21C are graphs showing the X-ray diffraction intensity of Fe-Co-N magnetic films formed by different growth rates.

FIGS. 21A, 21B, and 21C show the X-ray diffraction patterns of Fe-Co-N magnetic films A, B, and C formed at the growth rate of 360 Å/min, 328 Å/min, and 100 Å/min, respectively. Referring to these diffraction patterns, the diffraction peaks of Fe$_4$N, Fe$_3$N, and Fe$_2$N in order become significant as a function of decrease in film growth rate, with the nitrogenation degree of the Fe-Co-N magnetic film increasing in proportion to the decrease in the film growth rate.

TABLE 3

| Film | Growth Rate (Å/min) | Ms (emu/cc) | Hk (KOe) | Hc$_\perp$ (Oe) | α-Fe | r'-Fe$_4$N | Fe$_3$N | ε-Fe$_x$N | ζ-Fe$_2$N | α-Co | γ-Co$_3$N | δ-Co$_3$N |
|---|---|---|---|---|---|---|---|---|---|---|---|---|
| A | 360 | 450 | 2.6 | 530 | ◯ | ⊙ | ◯ | ◯ | ◯ | ◯ | ◯ | |
| B | 328 | 260 | 3.5 | 560 | ◯ | ◯ | ⊙ | ⊙ | ◯ | ◯ | ◯ | |
| C | 100 | 36 | 1.6 | 180 | ◯ | ◯ | ◯ | ◯ | ⊙ | ◯ | ◯ | ◯ |

⊙: Highest Diffraction Peak
◯: Diffraction Peak

Table 3 shows the growth rate, the magnetic characteristics, and the generation phases determined from the diffraction angle of Fe-Co-N magnetic films A, B, and C shown in FIGS. 21A–21C.

As can be seen from FIGS. 21A–21C and Table 3, each magnetic film A, B, and C show a diffraction pattern mixed of α-Fe, γ'-Fe$_4$N, γ'-Fe$_3$, ε-Fe$_x$N ($2 \leq X \leq 3$), ζ-Fe$_2$N, α-Co, γ-Co$_3$N, and δ-Co$_2$N. Attention is directed to Fe-Co-N magnetic films A and B having high anisotropy magnetic field, where metal phases (α-Fe, α-Co) not nitrogenized remain in the film. It is appreciated that the film is partially nitrogenized. If the nitrogenation degree is increased, metal phases (α-Fe, α-Co) and γ'-Fe$_4$N phase or the like decrease, and high nitrogenized phases (Fe$_3$N, ε-Fe$_x$N ($2 \leq X \leq 3$), ζ-Fe$_2$N, γ-Co$_3$N, δ-Co$_2$N) increase. Because ζ-Fe$_2$N phase and ε-Fe$_x$N ($2 \leq X \leq 2.47$) phase show paramagnetism in room temperature, it is considered that the reduction in saturation magnetization Ms in proportion to the decrease in the growth rate is due to the increase of the paramagnetism phase.

If ζ-Fe$_2$N of paramagnetic phase is increased, saturation magnetization will decrease. However, ζ-Fe$_2$N phase is an important factor in the formation of columnar crystal structure in the Fe-Co-N magnetic film, and is indispensable to the improvement of perpendicular magnetic anisotropy of Fe-Co-N magnetic film.

Figure 22A:
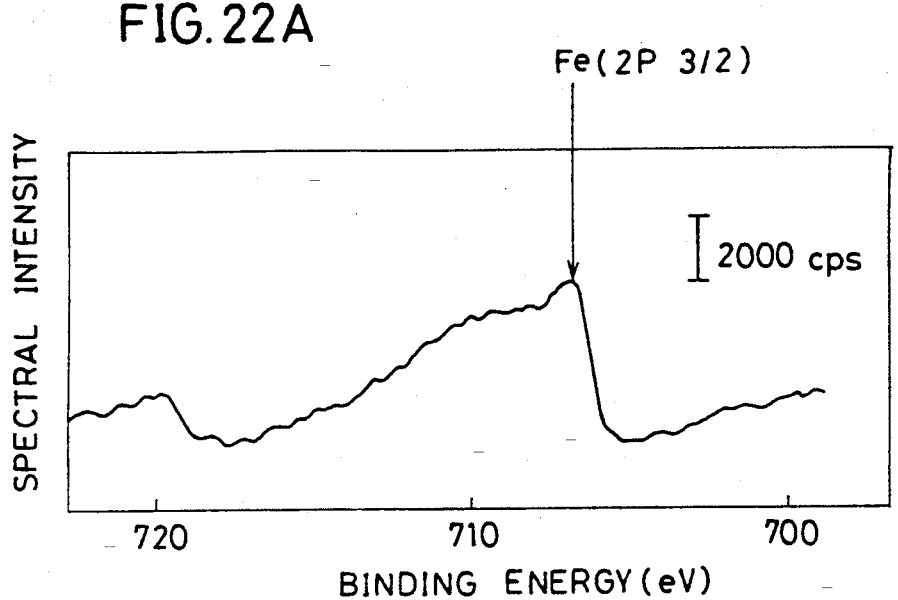
FIGS. 22A and 22B are graphs showing the spectra in XPS (X-ray photoelectron spectroscopy) of the $Fe_{68}$-$Co_{32}$-N magnetic film.
Figure 22B:
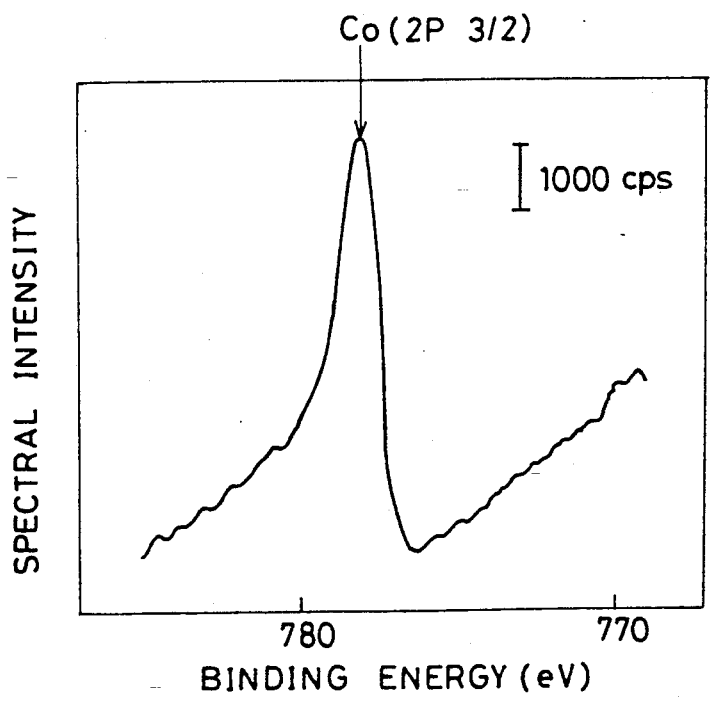

FIGS. 22A and 22B are graphs showing the XPS spectra of the Fe$_{68}$Co$_{32}$-N magnetic film having the magnetic characteristics of Hk=3.3 kOe, Hc$_\perp$=5200 Oe, and Ms=3.4 kGauss. In the graphs, the abscissa represents binding energy, while the ordinate represents spectrum relative intensity. The iron electron energy of 2P3/2 level generates a spectrum peak at 707 eV in FIG. 22A, where a superposed spectrum of iron nitride showing chemical shifting spreads towards the high energy side for chemical bonding with nitride. It can be appreciated from the cobalt 2P3/2 level of FIG. 22B that the rate of the spectrum showing chemical shifting by nitrogenation is low compared to that of the case of iron, with the major part of cobalt existing in the state of metal. This means that cobalt is harder to nitrogenize in comparison with iron. This indicates that the addition of cobalt having different affinity for nitrogen to iron gives the possibility of improving magnetic anisotropy energy Ku by changing the nitride formation state during film growth.

Table 4 shows the magnetic characteristics and the compositional analysis results of Fe-Co-N magnetic films D and E used in the XPS analysis.

TABLE 4

| Film | Ms (emu/cc) | Hk (kOe) | Fe:Co | Nitrogen Content (at. %) |
|---|---|---|---|---|
| D | 245 | 3.2 | 94:6 | 11 |
| E | 270 | 3.3 | 68:32 | 11 |

Comparing the magnetic characteristics of magnetic films D and E having equal nitrogen content, that is to say, with equal nitrogenation degree from Table 4, it is clear that saturation magnetization Ms improves in proportion to the Co content in the magnetic film. The improvement of saturation magnetization of the Fe-Co-N magnetic film by adding Co can be explained by the magnetic moment of Fe-Co alloy phase mainly contributed to magnetization changing in accordance with the Co addition amount.

Tables 5 and 6 show the magnetic characteristics of Fe-Co-N magnetic film and Fe-N magnetic film formed under Film Growth Condition III.

TABLE 5

| Film | Hk (kOe) | Hc$_\perp$ (Oe) | Ms (kGauss) |
|---|---|---|---|
| Fe—N | 3.2 | 410 | 3.1 |
| Fe$_{77}$Co$_{23}$—N | 4.2 | 580 | 3.1 |

TABLE 6

| Film | Ms (kGauss) | Nitrogen Content (at. %) |
|---|---|---|
| Fe$_{94}$Co$_6$—N | 3.1 | 11.0 |
| Fe$_{58}$Co$_{32}$—N | 3.4 | 11.0 |

It can be appreciated from Tables 5 and 6 that perpendicular anisotropy magnetic field Hk, perpendicular coercive force Hc$_\perp$, and saturation magnetization Ms improve by adding an appropriate amount of Co to the Fe-N magnetic film.

It is considered that the improvement of perpendicular anisotropy magnetic field Hk is attributed to the increase of magnetic anisotropy energy Ku, due to the distribution state of nitride changing in the perpendicular columnar crystal structure. This arises from the addition of Co having difference in affinity for nitrogen, which changes the nitride formation manner during the process of film growth to enhance phase separation of ferromagnetic phase by paramagnetic nitride phase. The increase of perpendicular coercive force Hc$_\perp$ arises from the improvement of perpendicular anisotropy magnetic field Hk. It is considered that the improvement of saturation magnetization Ms is due to the increase of magnetic moment of Fe-Co alloy phase contributed to magnetization by the addition of Co.

In accordance with the second embodiment, the film growth rate (100–750 Å/min) is more than two times the rate of the prior art using the sputtering method (approximately 50 Å/min). This means that the magnetic film formation method of the second embodiment is also suitable for mass production.

Thus, in accordance with the present invention, perpendicular magnetic recording media with superior perpendicular magnetic characteristics can be provided in satisfactory mass production.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A perpendicular magnetic recording medium comprising:
   a non-magnetic substrate having a main surface, and
   a Fe-N system magnetic thin film formed on said main surface,
   said magnetic film including not only a ferromagnetic phase, but also of paramagnetic phase $\zeta$-$Fe_2N$ as its largest component, said magnetic thin film
   having a columnar crystal structure extending in a direction substantially perpendicular to said main surface and having substantially perpendicular magnetic anisotropy as a result of said $\zeta$-$Fe_2N$.

2. The perpendicular magnetic recording medium according to claim 1, wherein said ferromagnetic phase includes $\alpha$-Fe.

3. The perpendicular magnetic recording medium according to claim 2, wherein said ferromagnetic phase further includes $\gamma'$-$Fe_4N$.

4. A perpendicular magnetic recording medium comprising:
   a non-magnetic substrate having a main surface, and
   a Fe-Co-N system magnetic thin film formed on said main surface,
   said magnetic film including Co of not more than Co/(Fe+Co)=50 at.%, and $\zeta$-$Fe_2N$,
   characterized in that said magnetic film has columnar crystal structure extending in a direction substantially perpendicular to said main surface and having substantially perpendicular magnetic anisotropy as a result of said $\zeta$-$Fe_2N$.

* * * * *